Patented Jan. 30, 1940

2,188,351

UNITED STATES PATENT OFFICE 2,188,351

N-SUBSTITUTED SULPHAMATE

Harold S. Holt, Wilmington, Del., assignor to E. I. du Pont de Nemours & Company, Wilmington, Del., a corporation of Delaware No Drawing. Application February 2, 1938, Serial No. 188,395

10 Claims. (Cl. 23—114)

This invention relates to inorganic compounds and more particularly to compounds of sulphamic acid.

This invention has as an object the preparation of novel derivatives of sulphamic acid. A further object is the provision of a process for making these novel compounds. A still further object is the preparation of new compounds useful as intermediates in the preparation of inorganic and organic compounds. Other objects will appear hereinafter.

These objects are accomplished by the following invention wherein an alkali metal is reacted in anhydrous liquid ammonia with a salt of sulphamic acid, the cation of which may or may not be an alkali metal, which in turn may or may not be the particular alkali metal reacted. Thus, sodium is reacted with sodium, ammonium or magnesium sulphamate. In any case, an alkali metal salt of an N-alkali metal sulphamic acid is obtained, in which compound the latter alkali metal is at least as low in the electromotive series as is the former. The N-mono-alkali metal compounds have the comprehensive formula M—NH—SO$_3$M′, M and M′ representing alkali metals having the relationship stated.

When one mol of metallic sodium is added to a solution of one mol of sodium sulphamate dissolved in anhydrous liquid ammonia, a white precipitate having the chemical composition and structure represented by the formula, NaNHSO$_3$Na, is formed. The blue color of the ammoniacal solution of the metallic sodium disappears less readily when more than one mol of sodium metal per mol of sodium sulphamate is used, thereby indicating that the formation of the N-dialkali metal salt (Na$_2$NSO$_3$Na) takes place more slowly. The N-sodium sodium sulphamate (NaNHSO$_3$Na) may be isolated by filtration of the ammonia solution or by simple evaporation of the ammonia. In each case a finely divided dry powder is obtained which is stable upon storage but is easily hydrolyzed in water yielding sodium hydroxide and sodium sulphamate in equivalent mol proportions.

Potassium metal reacts with potassium sulphamate as does sodium with sodium sulphamate, i. e., the N-mono potassium potassium sulphamate is readily formed, while the N-dipotassium salt is formed only slowly owing to its low solubility in liquid ammonia. The N-lithium, N-cesium, and N-rubidium derivatives of lithium, cesium and rubidium sulphamates may be prepared similarly.

When a sulphamate, the cation of which is below the alkali metals in the electromotive series, for example, ammonium sulphamate, is dissolved in anhydrous liquid ammonia and reacted with sodium or other alkali metal, a molecular excess of the alkali metal is needed if an N-alkali metal derivative is to be obtained. The alkali metal first replaces the cation, e. g., ammonium, with formation of alkali metal, e. g., sodium, sulphamate, and then replaces the hydrogen of the amido group with the formation of mono- or di-alkali metal derivatives of the alkali metal sulphamate depending upon the quantity of sodium or other alkali metal used.

If the cation of the sulphamate reacted is an alkali metal other than the alkali metal used, this cation will be replaced when the latter alkali metal occupies a higher place in the electromotive series than the former, but will be substantially unaffected if the opposite is true. When this cation is an alkali metal and is replaced, it may and usually does react with the amido hydrogen if equimolar parts of alkali metal and alkali metal sulphamates were employed initially.

The more detailed practice of the invention is illustrated by the following examples, wherein parts given are by weight unless otherwise stated. There are of course many forms of the invention other than these specific embodiments.

Example I

To 23 parts of sodium sulphamate dissolved in 350 parts of anhydrous liquid ammonia was added gradually in small portions 4.4 parts of sodium metal. The solution was stirred continuously and cooled by means of a solid carbon dioxide cooling bath. The blue color produced by solution of the sodium in liquid ammonia disappeared rapidly; hydrogen was evolved; and the N-sodium derivative precipitated from solution as a finely divided white solid. When a weighed quantity of the dry product after removal of residual ammonia was placed in water, and the solution was titrated with standard acid, the theoretical quantity of alkali derived from hydrolysis of N-sodium sodium sulphamate, NaNHSO$_3$Na, was found to be present. Similar results were obtained when an excess of sodium sulphamate dissolved in liquid ammonia was used and the product filtered and then washed with liquid ammonia leaving pure N-sodium sodium sulphamate upon the filter.

*Example II*

To 135 parts of potassium sulphamate dissolved in about 500 parts by weight of anhydrous liquid ammonia was added gradually with stirring 19.5 parts of potassium metal. The reaction mixture was cooled by means of a solid carbon dioxide cooling mixture, and additional liquid ammonia was added to replace the small amount lost by evaporation during the reaction period of about 1 hour. The reaction mixture was then allowed to stand for about 20 hours, during which period the ammonia volatilized. The dry, colorless product which remained was found to be the N-monopotassium derivative of potassium sulphamate.

Lithium, cesium, and rubidium may be substituted for potassium in the above example, and the compounds obtained will be in accordance with the principles hereinbefore stated.

The reaction between the alkali metal and the alkali metal salt of sulphamic acid is generally carried out at a temperature below the boiling point of liquid ammonia. It may also be carried out at temperatures above the normal boiling point of ammonia if a closed system under increased pressure is used, i. e., the reaction is carried out in liquid ammonia which requires increased pressure to remain in the liquid state as the temperature is increased. The ammonia used as the solvent may be recovered for reuse in subsequent reactions. It is essential that moisture be excluded from the reaction in order to obtain the product desired and to secure an optimum yield. The amount of ammonia used is not important providing sufficient quantity is employed to give a solution which can be suitably stirred as the product is precipitated. Instead of ammonia, there may be used any solvent which dissolves but does not react with the alkali metal under the conditions of operation.

While, as shown in the examples, one mol of alkali metal is preferably reacted with one mol of the alkali metal sulphamate, other proportions may be used. A solution of the sulphamate in liquid ammonia may also be added to the alkali metal dissolved in liquid ammonia.

Compounds in which the N-alkali metal and the cation alkali metal are different may be made by reacting an alkali metal sulphamate with a different alkali metal, these reactants being chosen in accordance with the foregoing principles if a particular compound is desired. Thus, N-sodium potassium sulphamate may be prepared from sodium and potassium sulphamate, or from potassium and sodium sulphamate. In all instances however the N-alkali metal, where different from the cation alkali metal, is lower in the electromotive series.

N-disubstituted derivatives may be prepared, but much less readily, by using a molecular excess of the alkali metal over that required to produce the N-mono-alkali metal compound. As the N-mono-substituted derivatives is only slightly soluble in liquid ammonia, the preparation of a disubstitution product must be carried out in a large excess of solvent (ammonia) using the calculated quantity of alkali metal. It is also desirable to employ a closed system operating under increased pressure so that a higher temperature (increasing solubility) may be used.

The products of this invention may serve as alkali standards in analytical work, as dehydrating agents for organic liquids, and as intermediates for the preparation of complex organic compounds. For example, certain organic compounds containing active halogens, i. e., those attached to saturated carbon, and having the general formula R—X, where R represents an organic group and X represents a reactive halogen atom, may be reacted with N-alkali metal derivatives of sulphamates to give salts of substituted sulphamic acids having the general formula $R-NHSO_3M$, $R-NHSO_3R$, $R_2NSO_3R$, or $R_2NSO_3M$, in which R represents an organic group and M represents an alkali metal. The N-alkali metal derivatives may also be reacted with halogens to form the N-halogen derivatives, $X-NH-SO_3Na$, where X is a halogen atom.

The above description and examples are intended to be illustrative only. Any modification of or variation therefrom which conforms to the spirit of the invention is intended to be included within the scope of the claims.

I claim:

1. N-sodium sodium sulphamate, $NaHNSO_3Na$.
2. A compound of the formula $M-NH-SO_3M$ wherein M is an alkali metal.
3. A sodium compound of sulphamic acid wherein the hydroxyl hydrogen and at least one amido hydrogen are replaced by sodium.
4. A potassium compound of sulphamic acid wherein the hydroxyl hydrogen and at least one amido hydrogen are replaced by potassium.
5. A compound of the formula $M-NHSO_3M'$, where M and M' are alkali metals, M being at least as low in the electromotive series as M'.
6. An alkali metal compound of sulphamic acid wherein the hydroxyl hydrogen and at least one amido hydrogen are replaced by alkali metal atoms, that replacing the amido hydrogen being at least as low in the electromotive series as that replacing the hydroxyl hydrogen.
7. Process which comprises reacting sodium with a solution of sodium sulphamate in anhydrous liquid ammonia.
8. Process which comprises reacting an alkali metal with a solution, in anhydrous liquid ammonia, of an alkali metal sulphamate, said alkali metals being the same.
9. Process which comprises reacting an alkali metal with a solution, in anhydrous liquid ammonia, of an alkali metal sulphamate.
10. Process which comprises reacting an alkali metal, in anhydrous liquid ammonia, with a salt of sulphamic acid.

HAROLD S. HOLT.